Jan. 31, 1967 J. F. FRAZIER 3,302,001
TIME-TEMPERATURE CONTROL DEVICES
Filed July 2, 1964

INVENTOR.
JOHN F. FRAZIER
BY
Sughrue, Rothwell, Mion, Zinn and Macpeak
ATTORNEYS

United States Patent Office 3,302,001
Patented Jan. 31, 1967

3,302,001
TIME-TEMPERATURE CONTROL DEVICES
John F. Frazier, Painted Post, N.Y., assignor to Corning Glass Works, Corning, N.Y., a corporation of New York
Filed July 2, 1964, Ser. No. 379,812
5 Claims. (Cl. 219—491)

This invention relates to time-temperature control devices and particularly to devices for controlling the time during which a regulated temperature is maintained in electrically heated vessels, or the like, such as cooking appliances.

In general, electric table appliances have used either time or temperature as a means of automatic control, though for many cooking tasks both time and temperature control are essential for complete automatic regulation. Cost appears to have been the major deterrent. The mechanism, usually considered as a means for transferring the temperature information to the time function, has been a relay, either magnetic or thermal. These devices add considerable cost to a product already overburdened by the cost of a timer.

One object of the invention is to provide a low cost mechanism for combining time and temperature control in devices requiring a prescribed temperature to be maintained for a definite time duration. (In a preferred form of the invention this object is accomplished by modifying a timer so that it also serves as a magnetic relay, thereby avoiding the addition of a costly component.) The change requires only addition of a transfer switch, preferably a single-pole, double-throw, snap action switch, and necessary mechanical cam type linkages to the timer. After an initial period in which the heater is being brought up to the required temperature determined by a thermostat setting, and during which the timer motor circuit, extended through the transfer switch in normal position, is shunted out by the thermostat contact, that contact opens and the motor starts. A few revolutions of the motor suffice to cause the shift of the transfer switch by cam action, placing the motor directly on the line through the transferred position of the transfer switch and the timer switch. During the remainder of the run the motor is isolated from the heater control and stops only when the timer switch opens. At that instant the transfer switch is snapped back to its normal position and the circuit is ready for the next operation. Thus the timing cycle is delayed until the heater has achieved the set temperature and is thereafter unaffected by the regulation of the heater.

Accordingly, it is another object of the invention to provide a circuit and control means of the kind described characterized by simplicity and the use of standard components only slightly modified and rearranged.

Other objects of the invention will be pointed out in the following description and claims and illustrated in the accompanying drawing, which discloses, by way of example, the principle of the invention and the best mode which has been contemplated of applying that principle.

In the drawing, which shows a preferred embodiment of the invention,

Figure 1:
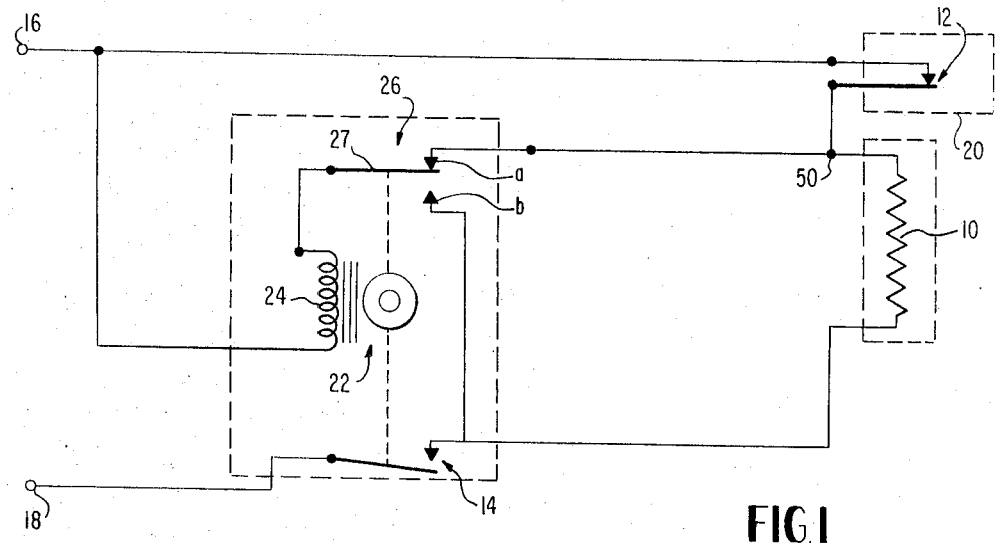
FIGURE 1 is a wiring diagram of an electrical table appliance embodying the invention.

Referring now to the drawing, FIGURE 1 shows a heater element 10 in series connection through normally closed contact 12 and normally open timer switch 14 (when closed) with terminals 16 and 18 of a plug connector through which 115 volt power is supplied. The contact 12 is a temperature responsive contact of a thermostat 20, which is preferably a creep type thermostat in heat conducting relation to the heater element. The thermostat can be set to regulate the temperature of the heater as required for the particular cooking operation. The normally open timer switch 14 is closed by the setting up of the cooking program, as will be described in connection with FIGURE 2.

A timer motor 22 has a winding 24 initially connected in shunt relation to the thermostat contact 12 through a transfer switch 26 in normal position, the circuit passing through blade 27 and stationary contact $a$. In the transferred position of the switch 26, when blade 27 is moved to stationary contact $b$, the circuit of the motor winding 24 is completed directly through the timer switch 14, by-passing the heater element and thermostat switch. During the warm-up period of the heater the motor is idle, being shunted by contact 12. The switch 26 is transferred from its normal position shortly after the motor begins to run, which occurs as soon as the thermostat contact opens, by the action of a cam operated by the timer motor, to be described in connection with FIGURE 2.

Figure 2:
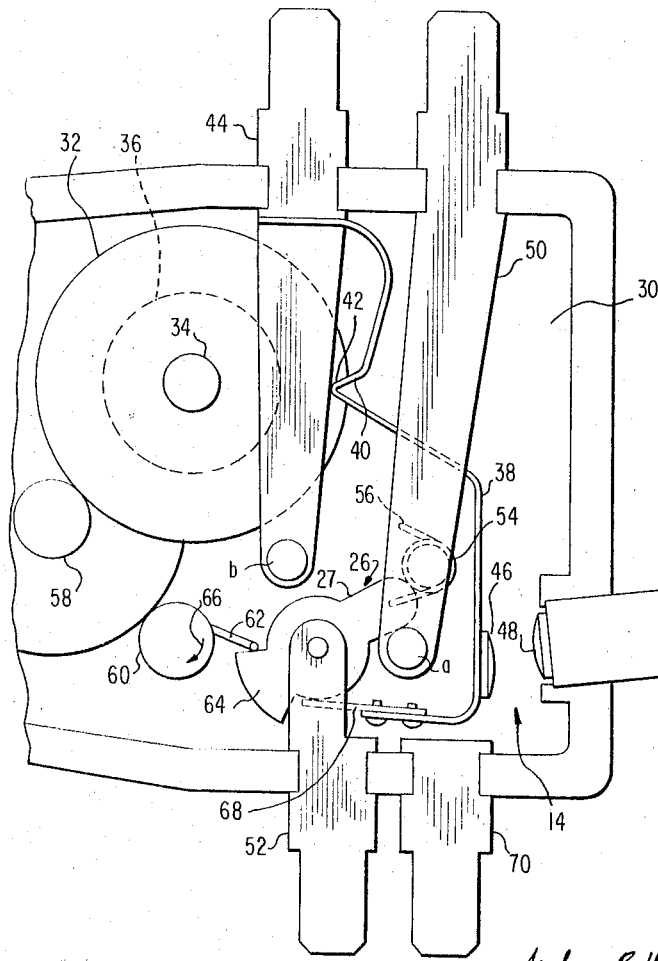
FIGURE 2 is a side elevation, with cover removed, of a timing and switching mechanism used in the appliance.

Turning, now, to FIGURE 2, on the rear wall of a casing 30 of insulating material a timer cam 32 is rotatably mounted by a shaft 34. Fixed to the opposite end of the shaft, behind the rear wall of the casing, is a graduated dial knob 36, which has graduations in minutes, not visible in the drawing. Bearing on the rim of the cam is a spring contact arm 38, which is one contact of the timer switch 14 of FIGURE 1. In the zero position of the timing dial 36 the knee 40 of arm 38 is pressed into a zero notch 42 of the cam 32, the arm 38 being mounted on a contact post 44 fixed to the rim of the casing 30 and being bent to have a bias toward the left. Opposite contact 46 of arm 38 is a stationary contact 48, these being the two contacts of the timer switch 14.

At the lower end of contact post 44 is a contact labeled $b$, which is one of the stationary contacts of the snap-action switch 26 of FIGURE 1. A second contact post 50 has at its lower end a contact labeled $a$, which is the other stationary contact of switch 26. Between these two contacts is an arm 27, also shown in FIGURE 1, which is mounted on a stationary contact post 52, so as to be capable of rocking from a normal position against contact $a$ to a transferred position against contact $b$. A spring 54, having one end connected to the arm 27, has its other end anchored at 56 to casing 30, so that the spring 54 is compressed during the movement of the arm 27 between contacts $a$ and $b$ in either direction, to provide the snap-action which holds the arm positively against either one of the contacts toward which it is moved.

The timer cam 32 is driven by a motor (not shown) through reduction gearing indicated generally at 58, so that when the timer cam is turned to any position other than zero and the motor is running, the graduations of the knob 36 will pass an index at the rate of one scale graduation per minute. Also driven by the motor, at an intermediate speed, is a cam 60, having an arm 62 which bears against the left edge of a sector shaped portion 64 of arm 27, as the arm 62 turns in the direction of the arrow 66 when the motor is running, to rock the arm 27 from contact $a$ to contact $b$. As will be described presently, at this time the arm 38 has been pressed to the right by the timer cam 32 and the turning of the arm 27 against contact $b$ brings the right edge of the extension 64 into proximity to a striking element 68 fixed to the end of arm 38. When the cam 32 returns to zero position and the arm 38 drops away to the left, the striking element 68 rocks arm 27 back into engagement with contact $a$.

A final item of this switch assembly is a terminal post 70 which serves to connect one end of winding 24 of the timer motor to the conductor leading to line terminal 16 (FIGURE 1).

To summarize the operation of the device, prior to a cooking program parts in FIGURES 1 and 2 are all in the position shown. The time program is initiated by manually turning the timer cam 32 to place the correct scale graduation opposite the index, in accordance with the program. This throws arm 38 to the right and closes switch 14, completing a circuit path from terminal 16 through normally closed contacts 12 of the temperature regulating thermostat 20, heater element 10, timer switch 14, to terminal 18. A parallel circuit path to the heater element extends from terminal 16 through winding 24 of the timer motor, switch 26 in normal position, to the connection 50 between the contact 12 and heater element 10. The winding 24 is therefore shunted by contact 12 and the motor does not start.

The heater element 10 heats up to a temperature which opens contact 12, removing the shunt circuit from winding 24 of the motor and causing the motor to start. Up to this time the timing phase of the program has not begun, the preliminary phase being purely one of raising the cooker to a temperature determined by the setting of the thermostat 20.

After a few turns of the motor the arm 62 of cam 60 has turned the switch arm 27 past the critical point and it snaps over against contact b. As shown in FIGURE 1, this removes the motor winding 24 from the influence of the heater control circuit and connects it directly through the timer switch 14 to the line. At the end of a period of time determined by the program the cam 32 returns to zero position and knee 40 of arm 38 drops into notch 42, opening the timer switch 14, which stops the motor and opens the heater circuit. The element 68 on arm 38 strikes extension 64 of arm 27, snapping the arm back against contact a and restoring the circuit to the starting condition.

It will be evident from the above description of one illustrative embodiment of the invention, that the objective of providing time and temperature control of an electrical heating appliance has been accomplished with a very simple arrangement, in which the timer motor itself acts as a magnetic relay to transfer the temperature information to the time function.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a time-temperature controlled device, a heater element; a thermostat in heat transfer relation to said heater element and including a normally closed thermally controlled contact; a timer switch including a movable arm; means forming a heater circuit path including, in series, said thermostat contact, said heater element, and said timer switch, and terminal means for connecting said heater circuit path to a source of electric power; a transfer switch having a normal and a transferred position; a motor having a winding; circuit means including said winding and said transfer switch in normal position, for connecting said winding in shunt relation to said thermostat switch; circuit means for connecting said winding through said transfer switch in transferred position to said timer switch; means including a timer cam operated by said motor and coacting with said movable arm to close and open said timer switch; cam means operated by said motor soon after starting for moving said transfer switch to its transferred position; and means operating in coincidence with the opening of said timer switch for restoring said transfer switch to its normal position.

2. A device as described in claim 1, wherein said last means includes an element fixed to said movable arm so as to strike said transfer switch to restore the same to normal position.

3. A device as described in claim 1, wherein said transfer switch is a snap-action switch.

4. In an electrical heat timing system for controlling the supply of heating current to a heating element from a source of current; means forming a first current path across such source including, in series connection, a thermostatic switch, said heating element, and a timer switch, said heating element being in heating relation to said thermostatic switch; a motor including a winding; means forming a second circuit path across said source including said winding, a transfer switch in normal position, said heating element, and said timer switch; means forming a third current path across said source including said winding, said transfer switch in transferred position, and said timer switch; and cam means operated by said motor for controlling the position of said timer switch and for throwing said transfer switch from normal to transferred position, and means operated by said timer switch on moving to open position for throwing said transfer switch back to normal position; whereby when said timer switch is closed with said thermostatic switch in closed position said motor winding is shunted, said second current path being made effective when said thermostatic switch opens, to energize said motor winding to drive said motor, said cam means being effective soon after said motor starts to establish said third path to connect said motor winding across said current source through said timer switch directly, and said camming means being effective at the end of a prescribed period of time to open said timer switch to terminate the operation of said motor and said heating element.

5. In combination with an electrical heating system including terminal means for connecting the system across a source of electrical current and means forming a series circuit path through a thermostatic switch, a heating element, and a timer switch, the heating element being in heating relation to the thermostatic switch: a timer motor including a winding; a transfer switch; means forming a circuit path connecting said winding through said transfer switch in normal position in shunt relation to said thermostatic switch and in series relation to said heater element and timer switch; means forming a series circuit path through said motor winding, said transfer switch in transferred position and said timer switch; and cam means operated by said timer motor for transferring said transfer switch and for controlling the position of said timer switch.

References Cited by the Examiner

UNITED STATES PATENTS

| 2,023,114 | 12/1935 | Biebel | 219—491 |
| 2,023,115 | 12/1935 | Biebel | 219—491 |
| 2,023,118 | 12/1935 | Biebel | 219—491 |

RICHARD M. WOOD, *Primary Examiner.*

L. H. BENDER, *Assistant Examiner.*